United States Patent
Matsumoto et al.

(10) Patent No.: US 7,165,923 B2
(45) Date of Patent: Jan. 23, 2007

(54) TOOL HOLDER

(75) Inventors: Masakazu Matsumoto, Osaka (JP);
Masahiro Taguchi, Osaka (JP);
Kazuhiro Shimono, Osaka (JP)

(73) Assignee: Nikken Kosakusho Works Ltd., Osaka (JP)

( * ) Notice: Subject to any disclaimer, the term of this patent is extended or adjusted under 35 U.S.C. 154(b) by 0 days.

(21) Appl. No.: 11/264,426

(22) Filed: Oct. 31, 2005

(65) Prior Publication Data

US 2006/0062645 A1 Mar. 23, 2006

Related U.S. Application Data

(62) Division of application No. 10/387,086, filed on Mar. 12, 2003, now Pat. No. 7,037,053.

(30) Foreign Application Priority Data

Mar. 18, 2002 (JP) .............................. 2002-73809
Apr. 17, 2002 (JP) ............................ 2002-114147

(51) Int. Cl.
*B23C 5/00* (2006.01)
(52) U.S. Cl. .................. 409/234; 408/153; 408/156
(58) Field of Classification Search ............. 409/234, 409/232; 408/153, 156, 154, 155, 173, 178, 408/239 A; 279/123, 121, 125, 4.03, 132, 279/133, 49, 52, 53, 54, 55, 56, 59; 82/159, 82/160

See application file for complete search history.

(56) References Cited

U.S. PATENT DOCUMENTS 3,136,561 A 6/1964 McAuliffe et al.
3,332,693 A 7/1967 Armstrong et al.
3,365,204 A 1/1968 Benjamin et al.
3,554,080 A 1/1971 Herrmann
3,652,100 A 3/1972 Baturka (Continued)

FOREIGN PATENT DOCUMENTS

EP 1 080 832 A2 3/2001

(Continued)

*Primary Examiner*—Monica Carter
*Assistant Examiner*—Dana Ross
(74) *Attorney, Agent, or Firm*—Ladas & Parry LLP

(57) ABSTRACT

A tool holder is equipped with a tip run-out correction mechanism for correcting run-out of the tip of the tool. The tip run-out correction mechanism includes an annular stepped portion formed on a cylindrical support portion of a holder body; a ring member rotatably fitted onto the annular stepped portion; an eccentric cam disposed within the ring member, the eccentric cam extending radially through the ring member and being rotatable about a radially extending axis; and a pin disposed within the ring member to be movable along a direction parallel to the center axis of a flange portion of the holder body. One end of the pin is in contact with the eccentric cam, and the other end of the pin is in contact with a rear end face of a clamp sleeve which clamps a tool inserted into a chuck sleeve of the holder body. The eccentric cam is rotated so as to adjust press force that the pin applies to the rear end face of the clamp sleeve, to thereby elastically deform a base end portion of the chuck sleeve in a radial direction in such a manner that tip run-out of the tool approaches zero.

7 Claims, 12 Drawing Sheets

U.S. PATENT DOCUMENTS

| | | |
|---|---|---|
| 3,719,367 A | 3/1973 | Baturka |
| 3,726,532 A | 4/1973 | Zeilinger |
| 3,815,930 A | 6/1974 | Mattes |
| 3,905,609 A | 9/1975 | Sussman |
| 4,499,800 A | 2/1985 | Stahl |
| 4,621,960 A | 11/1986 | Töllner |
| 4,657,454 A | 4/1987 | Migita et al. |
| 4,673,319 A | 6/1987 | Ishikawa |
| 4,699,388 A | 10/1987 | Sproccati |
| 4,714,389 A | 12/1987 | Johne |
| 4,817,972 A | 4/1989 | Kubo |
| 4,840,520 A | 6/1989 | Pfalzgraf |
| 4,886,402 A | 12/1989 | Pfalzgraf |
| 4,958,968 A | 9/1990 | von Haas et al. |
| 5,032,043 A | 7/1991 | Hollifield |
| 5,167,476 A | 12/1992 | Lafferty et al. |
| 5,249,895 A | 10/1993 | Blaser |
| 5,265,990 A | 11/1993 | Kuban |
| 5,286,042 A | 2/1994 | Laube |
| 5,314,198 A | 5/1994 | Kanaan |
| 5,340,127 A | 8/1994 | Martin |
| 5,352,073 A | 10/1994 | Kitaguchi |
| 5,427,484 A | 6/1995 | Galli |
| 5,492,441 A | 2/1996 | Schuerfeld |
| 5,522,605 A | 6/1996 | Lewis et al. |
| 5,567,093 A | 10/1996 | Richmond |
| 5,593,258 A | 1/1997 | Matsumoto et al. |
| 5,630,594 A | 5/1997 | Bronzino et al. |
| 5,716,173 A | 2/1998 | Matsumoto |
| 5,957,467 A | 9/1999 | Hornung |
| 5,957,636 A | 9/1999 | Boisvert |
| 5,964,556 A | 10/1999 | Toyomoto |
| 5,984,595 A | 11/1999 | Mizoguchi |
| 6,003,415 A | 12/1999 | Turner et al. |
| 6,071,219 A | 6/2000 | Cook |
| 6,109,842 A | 8/2000 | Cook |
| 6,209,886 B1 | 4/2001 | Estes et al. |
| 6,231,282 B1 | 5/2001 | Yoneyama et al. |
| 6,352,395 B1 | 3/2002 | Matsumoto et al. |
| 6,371,705 B1 | 4/2002 | Gaudreau |
| 6,923,451 B2 | 8/2005 | Taguchi et al. |

FOREIGN PATENT DOCUMENTS

| | | |
|---|---|---|
| EP | 1 080 832 A3 | 12/2001 |
| JP | 46-062467 | 7/1971 |
| JP | 49-125972 | 12/1974 |
| JP | 53-008949 | 4/1978 |
| JP | 58-094946 | 6/1983 |
| JP | 63-091335 | 6/1988 |
| JP | 01-246006 | 10/1989 |
| JP | 2512454 | 9/1991 |
| JP | 05-177419 | 7/1993 |
| JP | 06-015947 | 3/1994 |
| JP | 06-114612 | 4/1994 |
| JP | 08-108302 | 4/1996 |
| JP | 08-174374 | 7/1996 |
| JP | 09-290302 | 11/1997 |
| JP | 2000-263361 | 9/2000 |

TOOL HOLDER

CROSS-REFERENCE TO RELATED APPLICATIONS

This patent application is a divisional application of U.S. Ser. No. 10/387,086, filed on Mar. 12, 2003 now U.S. Pat. No. 7,037,053, which claims priority to Japanese Application Nos. 2002-73809, filed on Mar. 18, 2002, and 2002-114147, filed on Apr. 17, 2002.

BACKGROUND OF THE INVENTION

1. Field of the Invention

The present invention relates to a tool holder which is used to attach a cutting tool, such as a burnishing reamer or a drill, to a main spindle of a machine tool, and which can correct run-out of the tip of the cutting tool.

2. Description of the Related Art

In machining performed by a machine tool, a cutting tool must be attached to a main spindle of the machine tool with high accuracy in order to enable accurate machining.

In general, in the case where a cutting tool is chucked by use of a tool holder, run-out of the cutting tool as measured at a point located away from the chucked portion of the cutting tool toward the tip thereof by a predetermined distance is used as an index that represents run-out accuracy. Even a precision tool holder has a run-out accuracy of 3 to 5 µm. In other words, even when a precision chuck is used for a tool holder of a burnishing reamer, drill, or the like, difficulty is encountered in reducing run-out of the tip of the tool to zero. Therefore, a tool holder capable of correcting run-out of the tip of a tool has been proposed and put to practical use.

Conventional tool holders equipped with a tip run-out correcting mechanism will be described with reference to FIGS. 1 and 2.

FIG. 1 is a partially sectioned side view of a conventional tool holder equipped with a tip run-out correcting mechanism.

As shown in FIG. 1, a tool holder 1 includes a taper shank portion 2 to be attached to a main spindle of an unillustrated machine tool; a flange 3, which is formed at a larger-diameter-side end of the shank portion 2 and used for gripping the tool holder 1; and an arbor 4, which is formed integrally with the flange 3 in such a manner that the arbor 4 extends from an end of the flange 3 opposite the shank portion 2, and its axis is aligned with that of the flange 3. A cutting tool 6 such as a drill is attached to a tip portion of the arbor 4 by means of a collet chuck 5.

A shoulder portion 4a having a diameter greater than that of the arbor 4 is formed at a boundary between the arbor 4 and the flange 3. A rotary ring 7, which constitutes a tip run-out correcting mechanism, is rotatably fitted onto the shoulder portion 4a. A fixation bolt 8 radially penetrates the rotary ring 7 at an axial position facing the shoulder portion 4a and is in screw-engagement with the rotary ring 7. Thus, the rotary ring 7 can be fixed to the shoulder portion 4a by means of the fixation bolt 8. Further, four tip run-out correcting screws 9 radially penetrate the rotary ring 7 at an axial position facing a root portion of the arbor 4 and are in screw-engagement with the rotary ring 7.

When such a tool holder 1 is used, tip run-out of the cutting tool 6 is corrected as follows. An operator attaches to a main spindle of a machine tool the shank portion 2 of the tool holder 1, which carries the cutting tool 6. Subsequently, the operator brings a test indicator 10 into contact with a circumferential surface of a tip portion of the cutting tool 6. The operator measures the difference between the maximum and minimum readings of the test indicator 10 during rotation of the main spindle, as tip run-out of the cutting tool 6. Further, from the measured value, the operator determines an angular position at which the tip run-out of the cutting tool 6 becomes greatest. Subsequently, after rotation of the main spindle is stopped, the operator rotates the rotary ring 7 in such a manner that one of the correction screws 9 faces a circumferential surface section of the root portion of the arbor 4, the surface section corresponding to the angular position at which the tip run-out of the cutting tool 6 becomes greatest. The operator then fixes the rotary ring 7 by means of the fixation bolt 8. Subsequently, while viewing the test indicator 10, the operator tightens the correction screw 9 that faces the circumferential surface section of the root portion of the arbor 4 corresponding to the angular position at which the tip run-out becomes greatest, in order to elastically deform the arbor 4 in the screwing direction of the correction screw 9, to thereby correct the eccentricity of the tip of the cutting tool 6 in such a manner that the tip run-out of the cutting tool 6 approaches zero to a possible extent. Thus, the tip run-out of the cutting tool 6 can be corrected.

FIG. 2 is a partially sectioned side view of another conventional tool holder equipped with a tip run-out correcting mechanism.

As shown in FIG. 2, a tool holder 12 includes a taper shank 13 to be attached to a main spindle of an unillustrated machine tool; a flange 14, which is formed at a larger-diameter-side end of the shank 13 and used for gripping the tool holder 12; and an arbor 15, which is formed integrally with the flange 14 in such a manner that the arbor 15 extends from an end of the flange 14 opposite the shank portion 13, and its axis is aligned with that of the flange 14. A cutting tool 17 such as a drill is attached to a tip portion of the arbor 15 by means of a collet chuck 16.

In FIG. 2, reference numeral 18 denotes a run-out corrector for correcting tip run-out of the cutting tool 17 held on the tool holder 12 via the collet chuck 16. The run-out corrector 18 includes a ring member 181 and a push screw 182. The ring member 181 is removably attached to a tip portion of the arbor 15 and the periphery of a lock nut 161 of the collet chuck 16. The push screw 182 radially penetrates the ring member 181 and is in screw-engagement with the ring member 181.

When such a tool holder 12 is used, tip run-out of the cutting tool 17 is corrected as follows. An operator attaches to a main spindle of a machine tool the shank portion 13 of the tool holder 12, which carries the cutting tool 17. Subsequently, the operator brings a test indicator 19 into contact with a circumferential surface of a tip portion of the cutting tool 17. The operator measures the difference between the maximum and minimum readings of the test indicator 19 during rotation of the main spindle, as tip run-out of the cutting tool 17. Further, from measured value, the operator determines an angular position at which the tip run-out of the cutting tool 17 becomes greatest. Subsequently, after rotation of the main spindle is stopped, the operator rotates the ring member 181 in such a manner that the push screw 182 faces a peripheral portion of the lock nut 161, the portion corresponding to the angular position at which the tip run-out of the cutting tool 17 becomes greatest. Subsequently, while viewing the test indicator 19, the operator tightens the push screw 182 in order to apply pressure to that peripheral portion in the direction indicated by an arrow, to thereby correct the eccentricity of the tip of the cutting tool 17 in such a manner that the tip run-out of the cutting tool 17 approaches zero to a possible extent. Thus, the tip run-out of the cutting tool 17 can be corrected. After completion of run-out correction, the operator removes the run-out corrector 18 from the tool holder 12.

However, in the case of the tool holder 1 shown in FIG. 1, when the eccentricity of the tip of a tool is to be corrected, an operator must elastically deform the arbor 4 in a radial direction by radially pushing the root portion of the arbor 4 by use of the corresponding correction screw 9 of the tip run-out correction mechanism. Therefore, correction of tip run-out requires a large force. Therefore, such a conventional tip run-out correction mechanism can be applied only to tool holders for tools of small diameters.

Further, in the case of the tool holder 12 shown in FIG. 2, since the run-out corrector 18 is removed from the tool holder 12, after being corrected the tip of a tool may return to the original eccentric or deviated position; i.e., the corrected position of the tip of the tool cannot be maintained stably.

SUMMARY OF THE INVENTION

In view of the foregoing, an object of the present invention is to provide a tool holder equipped with a tip run-out correction function which enables an operator to easily correct tip run-out of a cutting tool with small force, can maintain high run-out accuracy attained through correction, and can be applied to holders used for cutting tools of large diameter.

In order to achieve the above-described object, the present invention provides a tool holder which comprises a holder body having a shank portion to be attached to a main spindle of a machine tool, a flange portion formed at an end of the shank portion and having a center axis aligned with a center axis of the shank portion, a support portion extending from the flange portion in a direction opposite the shank portion and having a center axis aligned with the center axis of the flange portion, and a chuck sleeve extending from a tip end of the support portion and having a center axis aligned with the center axis of the support portion, the chuck sleeve being elastically deformable and adapted to receive a shank portion of a tool; a clamp sleeve rotatably fitted onto the chuck sleeve, the clamp sleeve being rotated relative to the chuck sleeve to reduce a diameter of the chuck sleeve in order to hold the shank portion of the tool inserted into the chuck sleeve; and a tip run-out correction mechanism for correcting run-out of the tip of the tool.

The tip run-out correction mechanism includes an annular stepped portion concentrically formed on an outer circumference of the support portion; a ring member rotatably fitted onto the annular stepped portion; an eccentric cam disposed within the ring member, the eccentric cam extending radially through the ring member and being rotatable about a radially extending axis; and a pin disposed within the ring member to be movable along a direction parallel to the center axis of the flange portion, one end of the pin being in contact with the eccentric cam and the other end of the pin being in contact with a rear end face of the clamp sleeve or an end face of the annular stepped portion.

The eccentric cam is rotated so as to adjust press force that the pin applies to the rear end face of the clamp sleeve or the end face of the annular stepped portion, to thereby elastically deform a base end portion of the chuck sleeve adjacent to the flange portion in a radial direction in such a manner that tip run-out of the tool approaches zero.

Preferably, an annular groove is formed in a font end face of the support portion, from which the chuck sleeve extends axially, the annular groove promoting radial elastic deformation of the chuck sleeve and radial bending deformation of the chuck sleeve about the base portion serving as a bending point.

Preferably, the ring member includes a balance member for preventing unbalanced rotation of the ring member, which would otherwise result from provision of the eccentric cam.

Preferably, the ring member includes a lock screw for fixing the ring member to the annular stepped portion.

Alternatively, the tip run-out correction mechanism includes an annular stepped portion concentrically formed on an outer circumference of the support portion; a ring member rotatably fitted onto the annular stepped portion; an operation member disposed within the ring member, the operation member radially extending through the ring member and being rotatable about a radially extending axis; and a ball element disposed within the ring member to be located between the operation member and a rear end face of the clamp sleeve or an end face of the annular stepped portion, the ball element being movable along a direction parallel to the center axis of the flange portion.

The operation member is rotated so as to adjust press force that the ball element applies to the rear end face of the clamp sleeve or the end face of the annular stepped portion, to thereby elastically deform a base end portion of the chuck sleeve adjacent to the flange portion in a radial direction in such a manner that tip run-out of the tool approaches zero.

Preferably, the operation member assumes a cylindrical shape; an arcuate cam groove is formed on an outer circumferential surface of the operation member so as to be eccentric with respect to the axis of the operation member; the ball element is received in the cam groove; and the press force that the ball element applies to the rear end face of the clamp sleeve or the end face of the annular stepped portion is adjusted by means of the cam groove.

Preferably, an annular groove is formed in a font end face of the support portion, from which the chuck sleeve extends axially, the annular groove promoting radial elastic deformation of the chuck sleeve and radial bending deformation of the chuck sleeve about the base portion serving as a bending point.

Preferably, the ring member includes a balance member for preventing unbalanced rotation of the ring member, which would otherwise result from provision of the ball element.

Preferably, the ring member includes a lock screw for fixing the ring member to the annular stepped portion.

The present invention further provides a tool holder which comprises a holder body having a shank portion to be attached to a main spindle of a machine tool, a flange portion formed at an end of the shank portion and having a center axis aligned with a center axis of the shank portion, and an arbor extending from the flange portion in a direction opposite the shank portion and having a center axis aligned with the center axis of the flange portion; a chuck for holding a tool at a tip end of the arbor; and a tip run-out correction mechanism for correcting run-out of the tip of the tool.

The tip run-out correction mechanism includes a ring member rotatably fitted onto a base portion of the arbor adjacent to the flange portion; a stopper member provided on the arbor so as to hold the ring member at the base portion of the arbor; an eccentric cam disposed within the ring member, the eccentric cam extending radially through the ring member and being rotatable about a radially extending axis; and a pin disposed within the ring member to be movable along a direction parallel to the center axis of the arbor, one end of the pin being in contact with the eccentric cam and the other end of the pin being in contact with an end face of the flange portion or the stopper member.

The eccentric cam is rotated so as to adjust press force that the pin applies to the end face of the flange portion or the stopper member, to thereby elastically deform a base end portion of the arbor adjacent to the flange portion in a radial direction in such a manner that tip run-out of the tool approaches zero.

Preferably, the ring member includes a lock screw for fixing the ring member to the arbor.

Preferably, the stopper member is removably attached to the arbor by means of screw-engagement between the stopper member and the arbor, or by use of a lock screw.

Alternatively, the tip run-out correction mechanism includes a ring member rotatably fitted onto a base portion of the arbor adjacent to the flange portion; a stopper member provided on the arbor so as to hold the ring member at the base portion of the arbor; an operation member disposed within the ring member, the operation member extending radially through the ring member and being rotatable about a radially extending axis; and a ball element disposed within the ring member to be located between the operation member and an end face of the flange portion or the stopper member, the ball element being movable along a direction parallel to the center axis of the arbor.

The operation member is rotated so as to adjust press force that the ball element applies to the end face of the flange portion or the stopper member, to thereby elastically deform a base end portion of the arbor adjacent to the flange portion in a radial direction in such a manner that tip run-out of the tool approaches zero.

Preferably, the operation member assumes a cylindrical shape; an arcuate cam groove is formed on an outer circumferential surface of the operation member so as to be eccentric with respect to the axis of the operation member; the ball element is received in the cam groove; and the press force that the ball element applies to the end face of the flange portion or the stopper member is adjusted by means of the cam groove.

Preferably, the ring member includes a lock screw for fixing the ring member to the arbor.

Preferably, the stopper member is removably attached to the arbor by means of screw-engagement between the stopper member and the arbor, or by use of a lock screw.

Preferably, the ring member has a female thread hole for receiving the lock screw; and a thread ridge of the female thread hole is crushed in an area adjacent to the outer circumference of the ring member.

Preferably, the ball element has a flat press surface.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Figure 1:
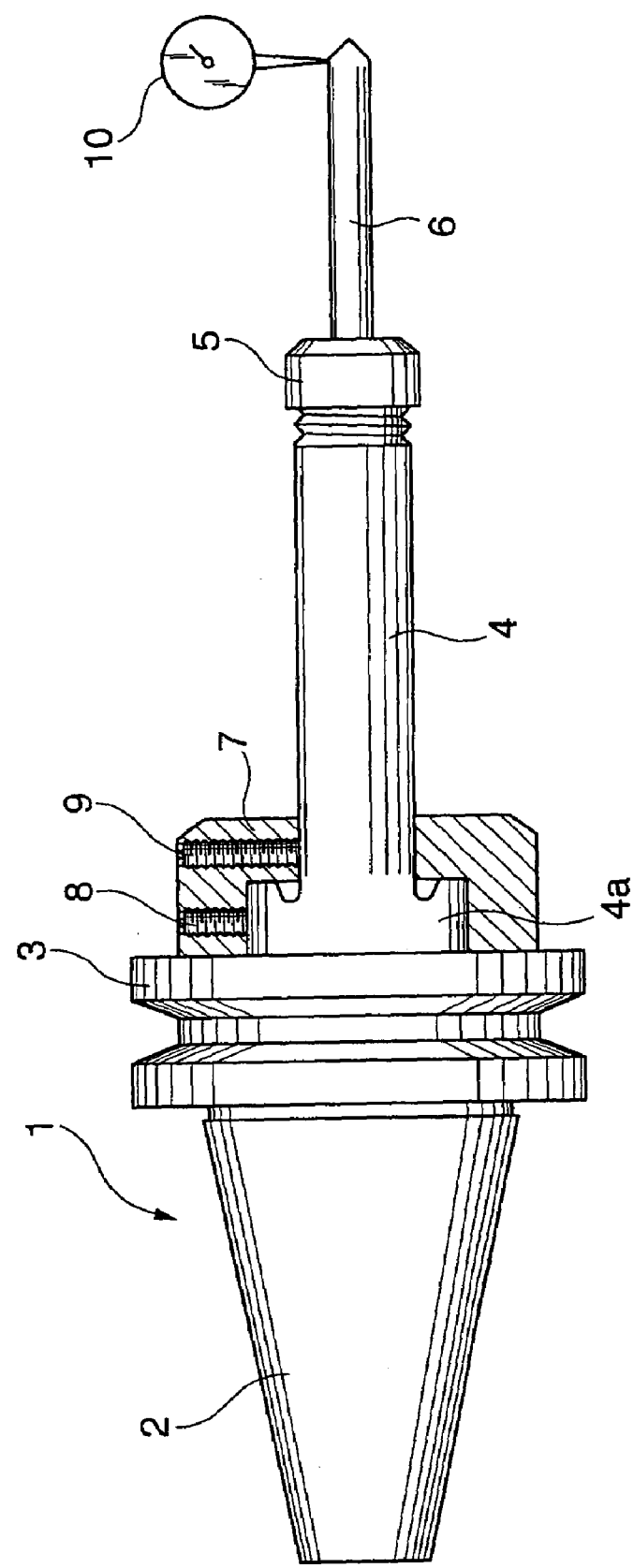
FIG. 1 is a partially sectioned side view of a conventional tool holder equipped with a tip run-out correcting mechanism.
Figure 2:
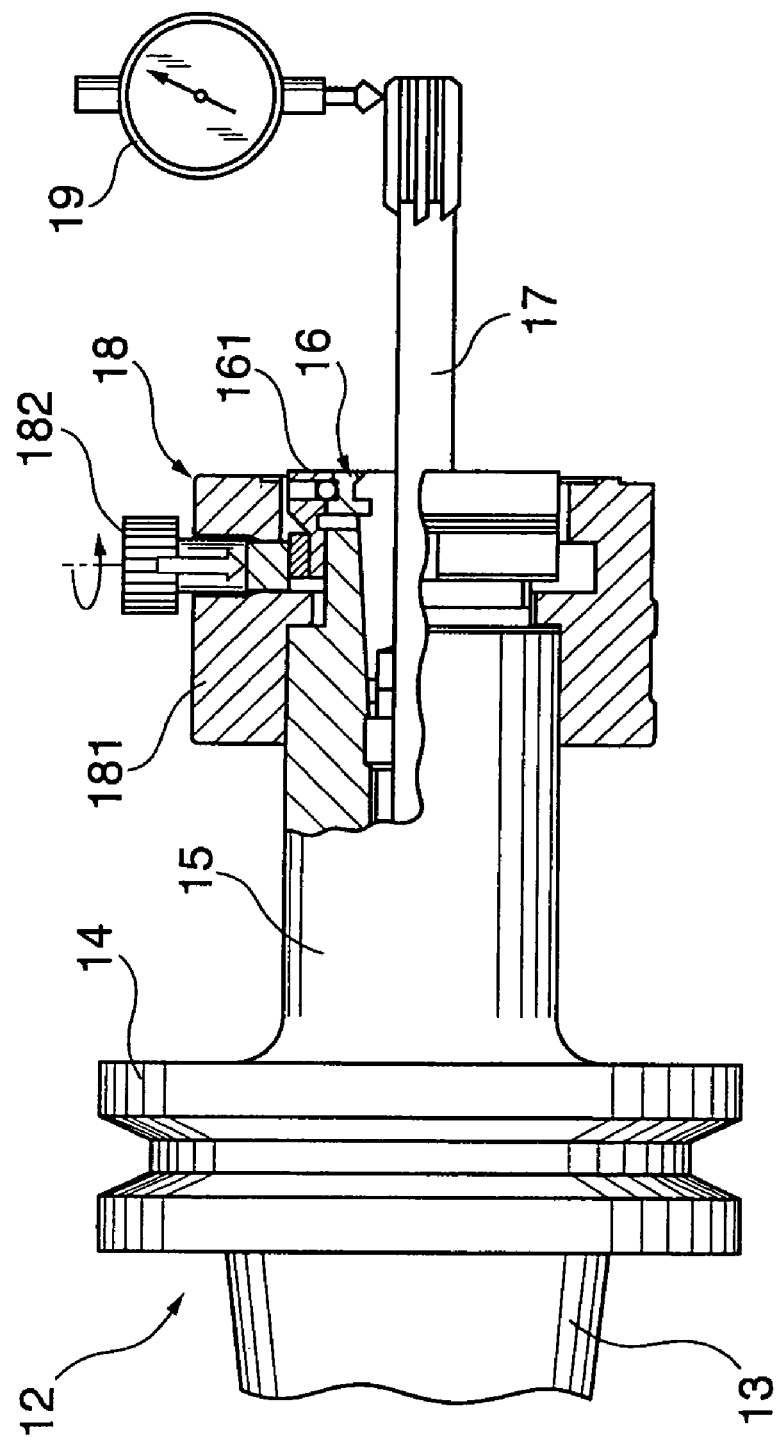
FIG. 2 is a partially sectioned side view of another conventional tool holder equipped with a tip run-out correcting mechanism.
Figure 3:
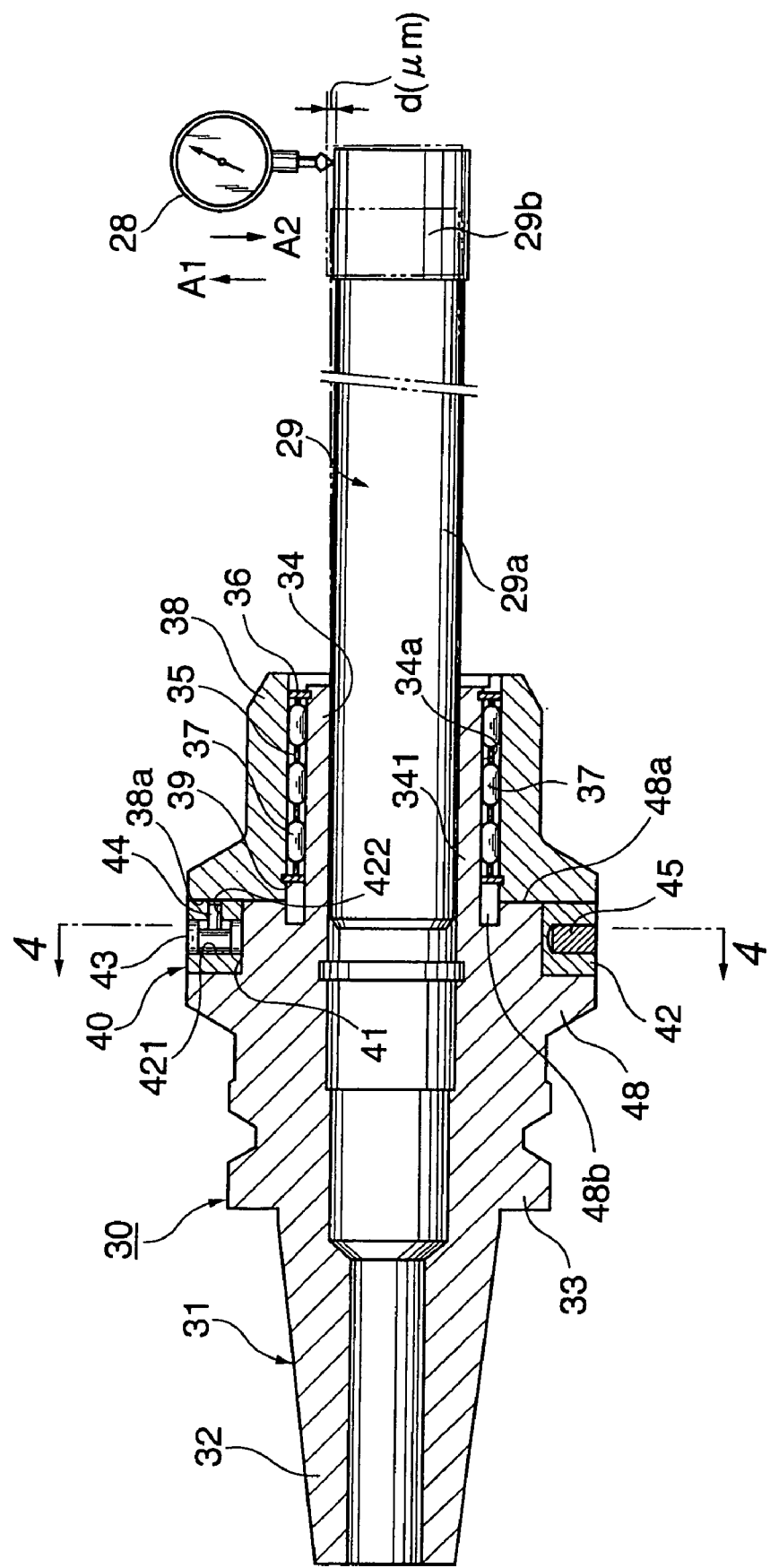
FIG. 3 is a longitudinal cross section of a tool holder equipped with a tip run-out correcting mechanism according to a first embodiment of the present invention.
Figure 4:
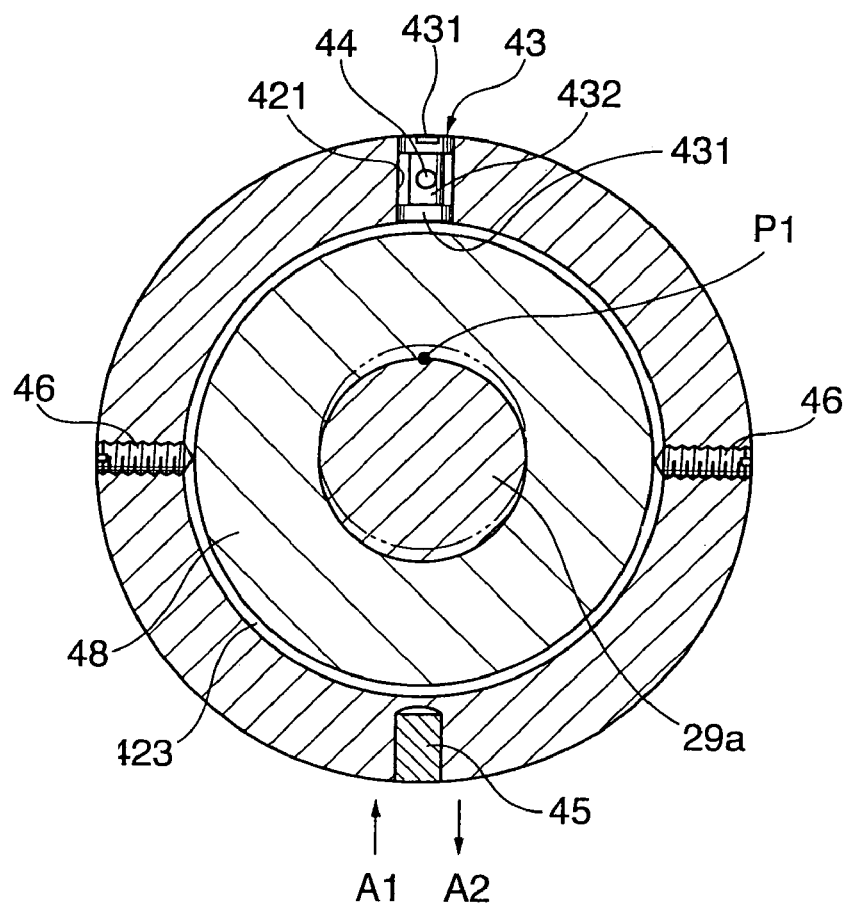
FIG. 4 is an enlarged cross section of the tool holder of the first embodiment, taken along line 4—4 in FIG. 3.
Figure 5:
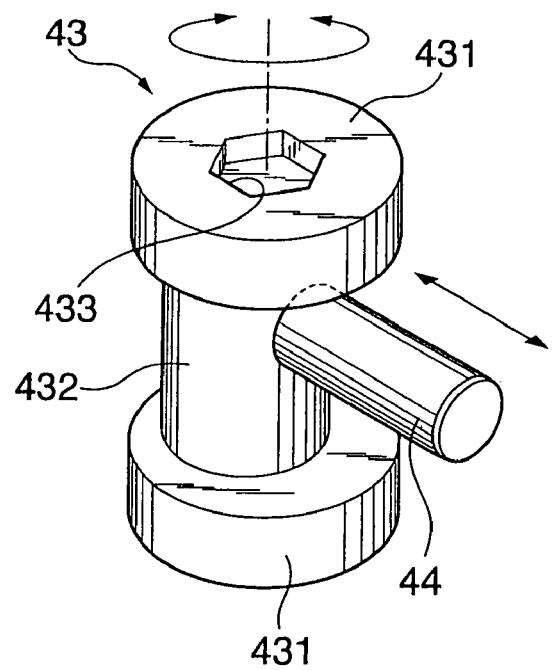
FIG. 5 is an enlarged perspective view of an eccentric cam and a run-out correction pin used in the tool holder of the first embodiment.

FIG. 3 is a longitudinal cross section of a tool holder equipped with a tip run-out correcting mechanism according to a first embodiment of the present invention; FIG. 4 is an enlarged cross section of the tool holder of the first embodiment, taken along line 4—4 in FIG. 3; and FIG. 5 is an enlarged perspective view of an eccentric cam and a run-out correction pin used in the tool holder of the first embodiment.

As shown in FIG. 3, a tool holder 30 for holding a cutting tool 29 such as a drill or a burnishing reamer has a holder body 31.

The holder body 31 includes a taper shank portion 32 to be attached to a main spindle of an unillustrated machine tool; a flange portion 33, which is formed at a larger-diameter-side end of the shank portion 32; a cylindrical support portion 48, which is formed integrally with the flange portion 33 in such a manner that the support portion 48 extends from an end of the flange portion 33 opposite the shank portion 32, and its center axis is aligned with that of the flange portion 33; and a cylindrical chuck sleeve 34, which extends from the tip end of the support portion 48, and whose center axis is aligned with that of the support portion 48. The chuck sleeve 34 has a tapered outer circumferential surface 34a such that the outer diameter of the chuck sleeve 34 gradually decreases from the flange portion 33 toward the distal end of the chuck sleeve 34.

In FIG. 3, reference numeral 35 denotes a roller retaining sleeve which is fitted onto the outer circumferential surface of the chuck sleeve 34 with a clearance formed therebetween. The roller retaining sleeve 35 is formed of a cylindrical tubular member whose diameter gradually decreases toward the distal end thereof; i.e., which is tapered at the same taper angle as that of the tapered outer circumferential surface 34a of the chuck sleeve 34. A stopper ring 36 fitted onto the outer periphery of a distal end portion of the chuck sleeve 34 holds the roller retaining sleeve 35, while preventing it from coming off the chuck sleeve 34.

A large number of needle rollers 37 are received in the roller retaining sleeve 35. The needle rollers 37 are arranged circumferentially at fixed intervals in such a manner that the needle rollers 37 are inclined circumferentially at a predetermined angle with respect to the center axis of the roller retaining sleeve 35. The needle rollers 37 have a diameter greater than the wall thickness of the roller retaining sleeve 35, whereby portions of the needle rollers 37 projecting radially inward from the roller retaining sleeve 35 are in contact with the tapered outer circumferential surface 34a of the chuck sleeve 34, and portions of the needle rollers 37 projecting radially outward from the roller retaining sleeve 35 are in contact with the inner wall surface of a clamp sleeve 38, which will be described below.

The clamp sleeve 38 is adapted to reduce the diameter of the chuck sleeve 34 to thereby tightly hold a tool. The clamp sleeve 38 is rotatably fitted onto the outer circumference of the chuck sleeve 34 via the needle rollers 37, which is held by the roller retaining sleeve 35. The clamp sleeve 38 has a tapered cylindrical inner circumferential surface such that the inner diameter of the clamp sleeve 38 gradually decreases from the flange portion 33 toward the distal end of the clamp sleeve 38. Further, a stopper ring 39, serving a seal ring as well, is attached to the inner circumferential surface of the clamp sleeve 38 at an axial position corresponding to a base end portion of the clamp sleeve 38 adjacent to the flange portion 33. The stopper ring 39 comes into contact with the outer circumferential surface of the chuck sleeve 34 to thereby provide a seal function, and comes into contact with an end face of the roller retaining sleeve 35 in order to prevent the clamp sleeve 38 from coming off the chuck sleeve 34.

In FIGS. 3 and 4, reference numeral 40 denotes a tip run-out correction mechanism for correcting run-out of the tip of the cutting tool 29. The tip run-out correction mechanism 40 includes an annular stepped portion 41, a ring member 42, an eccentric cam 43, and a pin 44.

The annular stepped portion 41 is formed on the outer circumference of the cylindrical support portion 48 to be located at an end of the support portion 48, which end faces a rear end face 38a of the clamp sleeve 38, in such a manner that the stepped portion 41 is coaxial with the support portion 48, and has a diameter smaller than that of the rear end face 38a of the clamp sleeve 38. Further, an annular groove 48b is formed in an end face 48a of the cylindrical support portion 48, from which the chuck sleeve 34 extends axially. The annular groove 48b increases the effective length of the chuck sleeve 34 in order to facilitate radial elastic deformation of the chuck sleeve 34 and radial bending deformation of the chuck sleeve 34 about the base end portion 341 of the chuck sleeve 34, which is continuous with the cylindrical support portion 48 and serves as a bending point.

The ring member 42 is fitted onto the outer circumference of the annular stepped portion 41 to be rotatable in the circumferential direction. The ring member 42 has a thickness corresponding to the difference between the outer diameter of the flange portion 33 and that of the annular stepped portion 41, and a rectangular cross section. As shown in FIGS. 3 and 4, a cam receiving hole 421 and a pin hole 422 communicating with the cam receiving hole 421 are formed in the ring member 42. The cam receiving hole 421 extends radially through the ring member 42. The pin hole 422 extends from the cam receiving hole 42, through the ring member 42, toward the rear end face 38a of the clamp sleeve 38 along a direction parallel to the center axis of the flange portion 33. The eccentric cam 43 is fitted into the cam receiving hole 421 to be rotatable about a radial direction of the ring member 42. The pin 44 is movably fitted into the pin hole 422.

As shown in FIGS. 3 and 5, the eccentric cam 43 includes a pair of support flanges 431 rotatably supported by means of the wall surface of the cam receiving hole 421; a cam portion 432 extending between the support flanges 431 and being eccentric with respect to the center axis of the support flanges 431; and a tool engagement hole 433 formed in one support flange 431 exposed at the outer circumference of the ring member 42.

One end of the pin 44, which is movably fitted into the pin hole 422, is in contact with the cam portion 432 of the eccentric cam 43, and the other end of the pin 44 is in contact with the rear end face 38a of the clamp sleeve 38.

As shown in FIG. 4, a balance member 45 is embedded in the ring member 42 at a position diametrically opposite the eccentric cam 43 in order to prevent unbalanced rotation of the ring member 42, which would otherwise result from provision of the eccentric cam 43.

Further, as shown in FIG. 4, a plurality of lock screws 46 are provided in the ring member 42 in order to fix the ring member 42 to the annular stepped portion 41 at a desired circumferential position or angular position. The lock screws 46 extend radially through the ring member 42 and are in screw engagement therewith. Further, an annular groove 423 is formed on the outer circumferential surface of the annular stepped portion 41, and the tip ends of the lock screws 46 enter and come into engagement with the groove 423.

Next, there will be described operation of correcting tip run-out of the cutting tool 29 held by the tool holder 30 by use of the tip run-out correction mechanism 40 having the above-described configuration.

First, an operator inserts a shank portion 29a of the cutting tool 29 into the chuck sleeve 34; and subsequently, the operator reduces the chuck sleeve 34 in diameter by use of the clamp sleeve 38 to thereby chuck the shank portion 29a of the cutting tool 29. Next, the operator attaches the tool holder 30, which carries the cutting tool 29, to a main spindle of an unillustrated machine tool. Subsequently, as shown in FIG. 3, the operator brings a test indicator 28 into contact with a circumferential surface of a tip portion of a cutting portion 29b of the cutting tool 29. The operator measures the difference between the maximum and minimum readings of the test indicator 28 during rotation of the main spindle, as tip run-out of the cutting tool 29. Further, from the measured value, the operator determines an angular position at which the tip run-out of the cutting tool 29 becomes greatest.

Subsequently, after rotation of the main spindle is stopped, the operator corrects the run-out on the basis of the determined angular position. Here, it is assumed that at the angular position P1 shown in FIG. 4, as indicated by an imaginary line, the tip of the cutting portion 29a deviates to the greatest extent in the direction of arrow A1, whereby the tip of the cutting portion 29a is located at a shifted position indicated by an imaginary line in FIG. 3. In this case, the ring member 42 is first rotated to a circumferential position at which the eccentric cam 43 coincides with the angular position P1. Subsequently, the operator locks the ring member 42 to the annular stepped portion 41 by use of the lock screws 46. In this state, the operates engages an unillustrated tool such as a bar spanner with the tool engagement hole 433 of the support flange 431 of the eccentric cam 43, and rotates the eccentric cam 43. When the eccentric cam 43 is rotated, the pin 44 moves toward the rear end face 38a of the clamp sleeve 38 by an amount corresponding to the amount of rotation of the eccentric cam 43, and then strongly pushes the rear end face 38a. As a result, the chuck sleeve 34 is elastically deformed, in a radial direction indicated by arrow A2 in FIG. 3, about the base end portion 341 of the chuck sleeve 34, which is continuous with the cylindrical support portion 48 and serves as a bending point. Specifically, while viewing the test indicator 28, the operator rotates the eccentric cam 43 in the direction for increasing the eccentricity thereof, in order to correct the position of the tip of the cutting tool 29 in such a manner that the tip of the cutting tool 29, which was located at a deviated position indicated by the imaginary line in FIG. 3, moves to a position indicated by a solid line. In this manner, the tip run-out d (µm) of the cutting tool 29 can be reduced to zero.

In the above-described first embodiment, the base end portion 341 of the chuck sleeve 34, which is continuous with the cylindrical support portion 48, is elastically deformed in a radial direction in order to reduce the tip run-out of the cutting tool 29 to zero, through an operation of rotating the eccentric cam 43 provided in the ring member 42, which is fitted onto the cylindrical support portion 48 of the holder body 31, to thereby adjust the pressing force which the pin 44 applies to the rear end face 38a of the clamp sleeve 38. Therefore, the tip run-out of the cutting tool 29 can be corrected with small force, and high run-out accuracy can be maintained stably. In addition, the run-out correction mechanism can easily be applied to tool holders for cutting tools of large diameter.

Next, a second embodiment of the present invention will be described with reference to FIGS. 6 and 7.

Figure 6:
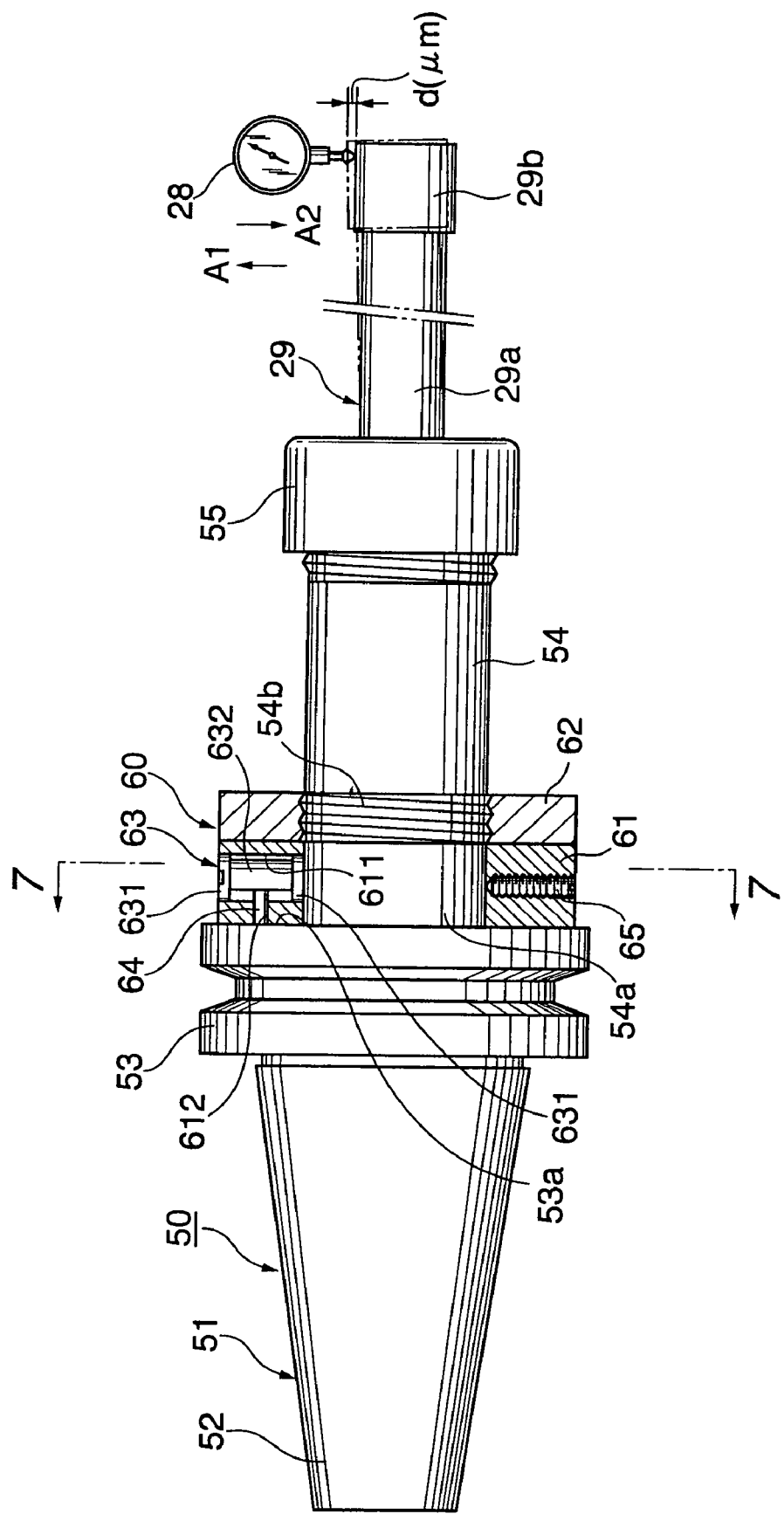
FIG. 6 is a longitudinal cross section of a tool holder equipped with a tip run-out correcting mechanism according to a second embodiment of the present invention.
Figure 7:
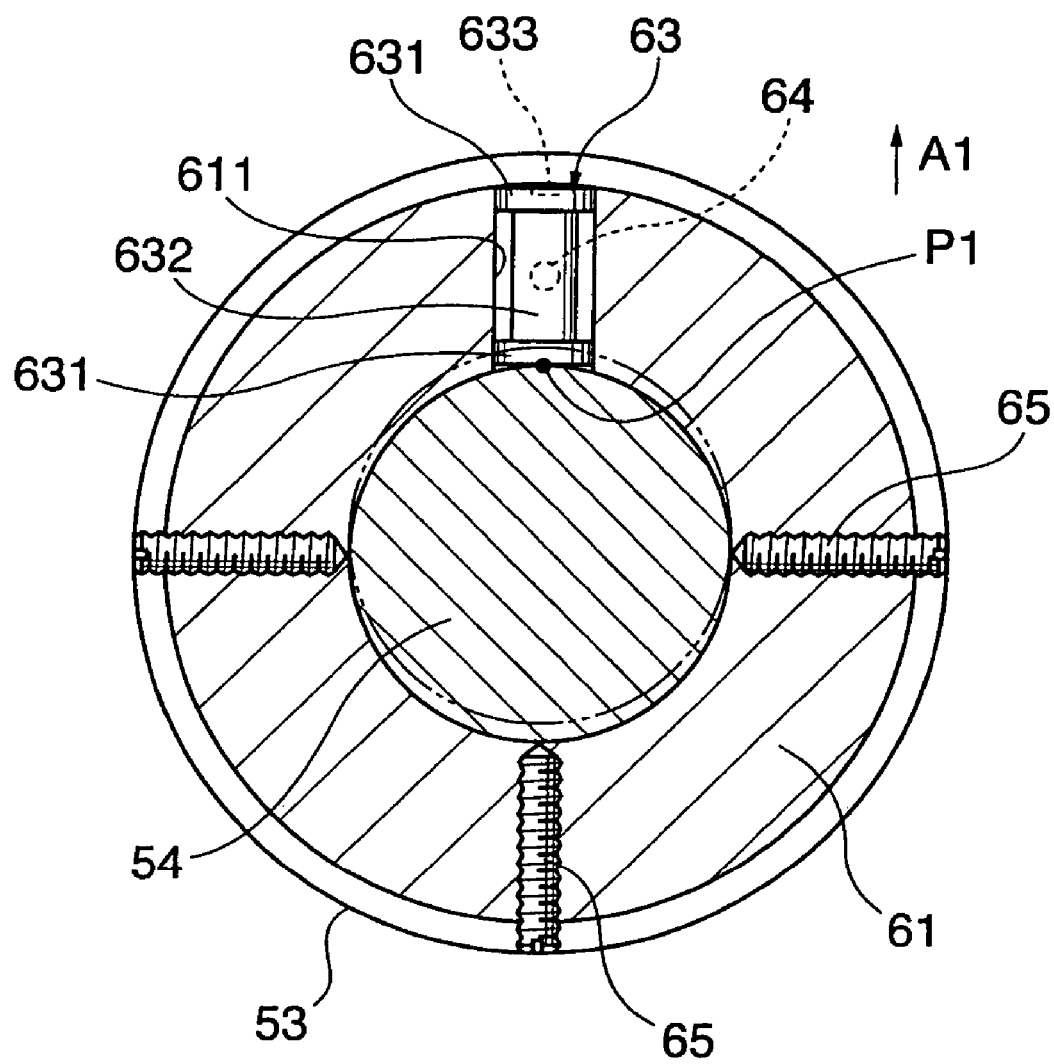
FIG. 7 is an enlarged cross section of the tool holder of the second embodiment, taken along line 7—7 in FIG. 6.

FIG. 6 is a longitudinal cross section of a tool holder equipped with a tip run-out correcting mechanism according to the second embodiment of the present invention; and FIG. 7 is an enlarged cross section of the tool holder of the second embodiment, taken along line 7—7 in FIG. 6.

As shown in FIG. 6, a tool holder 50 for holding a cutting tool 29 such as a drill or a burnishing reamer has a holder body 51. The holder body 51 includes a taper shank portion 52 to be attached to a main spindle of an unillustrated machine tool; a flange portion 53, which is formed at an end of the shank portion 52 and whose center axis is aligned with that of the shank portion 52; an arbor 54, which is formed integrally with the flange portion 53 in such a manner that the arbor 54 extends from an end of the flange portion 53 opposite the shank portion 52, and its center axis is aligned with that of the flange portion 53; and a chuck 55 for holding the cutting tool 29 at the tip end of the arbor 54.

A tip run-out correction mechanism 60 for correcting run-out of the tip of the cutting tool 29 is removably attached to a root portion of the arbor 54.

As shown in FIGS. 6 and 7, the tip run-out correction mechanism 60 includes a ring member 61, a stopper member 62, an eccentric cam 63, and a pin 64. The rind member 61 is rotatably fitted onto a base portion 54a of the arbor 54 adjacent to the flange portion 53. The stopper member 62 is removably screw-engaged with a male thread portion 54b formed on the arbor 54, in order to hold the ring member 61 on the root portion 54a.

As shown in FIGS. 6 and 7, a cam receiving hole 611 and a pin hole 612 communicating with the cam receiving hole 611 are formed in the ring member 61. The cam receiving hole 611 extends radially through the ring member 61. The pin hole 612 extends from the cam receiving hole 611, through the ring member 61, toward the front end face 53a of the flange portion 53 along a direction parallel to the center axis of the flange portion 53. The eccentric cam 63 is fitted into the cam receiving hole 611 to be rotatable about a radial direction of the ring member 61. The pin 64 is movably fitted into the pin hole 612.

As shown in FIGS. 6 and 7, the eccentric cam 63 includes a pair of support flanges 631 rotatably supported by the wall surface of the cam receiving hole 611; a cam portion 632 extending between the support flanges 631 and being eccentric with respect to the center axis of the support flanges 631; and a tool engagement hole 633 formed in one support flange 631 exposed at the outer circumference of the ring member 61.

One end of the pin 64, which is movably fitted into the pin hole 612, is in contact with the cam portion 632 of the eccentric cam 63, and the other end of the pin 64 is in contact with the front end face 53a of the flange portion 53.

As shown in FIG. 7, a plurality of lock screws 65 are provided in the ring member 61 in order to fix the ring member 61 to the arbor 54 at a desired circumferential position or angular position. The lock screws 65 extend radially through the ring member 61 and are in screw engagement therewith.

Next, there will be described operation of correcting tip run-out of the cutting tool 29 held by the tool holder 50 by use of the tip run-out correction mechanism 60 having the above-described configuration.

First, an operator attaches the cutting tool 29 to the tip end of the arbor 54 of the holder body 51 by means of the chuck 55, and then attaches the tool holder 50, which carries the cutting tool 29, to a main spindle of an unillustrated machine tool. Subsequently, as shown in FIG. 6, the operator brings a test indicator 28 into contact with a circumferential surface of a tip portion of a cutting portion 29b of the cutting tool 29. The operator measures the difference between the maximum and minimum readings of the test indicator 28 during rotation of the main spindle, as tip run-out of the cutting tool 29. Further, from the measured value, the operator determines an angular position at which the tip run-out of the cutting tool 29 becomes greatest.

Subsequently, after rotation of the main spindle is stopped, the operator corrects the run-out on the basis of the determined angular position. Here, it is assumed that at the angular position P1 shown in FIG. 7, as indicated by an imaginary line, the tip of the cutting portion 29a deviates to the greatest extent in the direction of arrow A1, whereby the tip of the cutting portion 29a is located at a shifted position indicated by an imaginary line in FIG. 6. In this case, the ring member 61 is first rotated to a circumferential position at which the eccentric cam 63 coincides with the angular position P1. Subsequently, the operator locks the ring member 61 to the arbor 54 by use of the lock screws 65. In this state, the operates engages an unillustrated tool such as a bar spanner with the tool engagement hole 633 of the support flange 631 of the eccentric cam 63, and rotates the eccentric cam 63. When the eccentric cam 63 is rotated, the pin 64 moves toward the front end face 53a of the flange portion 53 by an amount corresponding to the amount of rotation of the eccentric cam 63, and strongly pushes the front end face 53a. As a result, the arbor 54 is elastically deformed, in a radial direction indicated by arrow A2 in FIG. 6, about the base end portion 54a of the arbor 54, which is continuous with the flange portion 53 and serves as a bending point. Specifically, while viewing the test indicator 28, the operator rotates the eccentric cam 63 in the direction for increasing the eccentricity thereof, in order to correct the position of the tip of the cutting tool 29 in such a manner that the tip of the cutting tool 29, which was located at a deviated position indicated by the imaginary line in FIG. 6, moves to a position indicated by a solid line. In this manner, the tip run-out d (μm) of the cutting tool 29 can be reduced to zero.

In the above-described second embodiment, the base end portion 54a of the arbor 54, which is continuous with the flange portion 53, is elastically deformed in a radial direction in order to reduce the tip run-out of the cutting tool 29 to zero, through an operation of rotating the eccentric cam 63 provided in the ring member 61 to thereby adjust the pressing force which the pin 64 applies to the front end face 53a of the flange portion 53. Therefore, the tip run-out of the cutting tool 29 can be corrected with small force, and high run-out accuracy can be maintained stably. In addition, the run-out correction mechanism can be easily applied to tool holders for cutting tools of large diameter.

In addition, in the second embodiment, the ring member 61, which includes the eccentric cam 63 and the pin 64 and which constitutes the tip run-out correction mechanism 60, is held by means of the stopper member 62, which is removably attached to the arbor 54. Therefore, the tip run-out correction mechanism 60 can be easily applied to existing tool holders. In addition, a user is required to purchase only the tip run-out correction mechanism 60, which is economical.

Next, a third embodiment of the present invention will be described.

Figure 8:
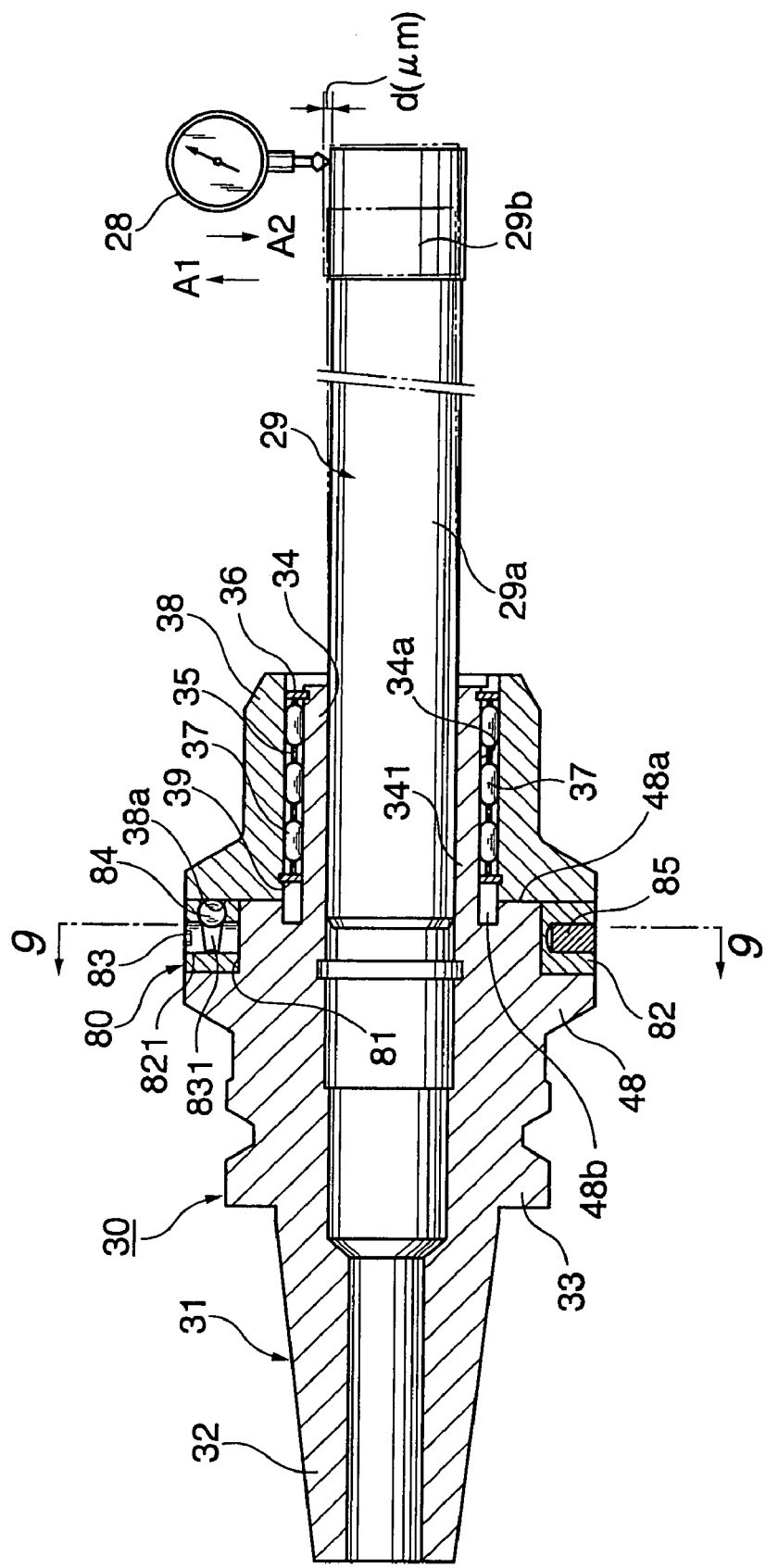
FIG. 8 is a longitudinal cross section of a tool holder equipped with a tip run-out correcting mechanism according to a third embodiment of the present invention.
Figure 9:
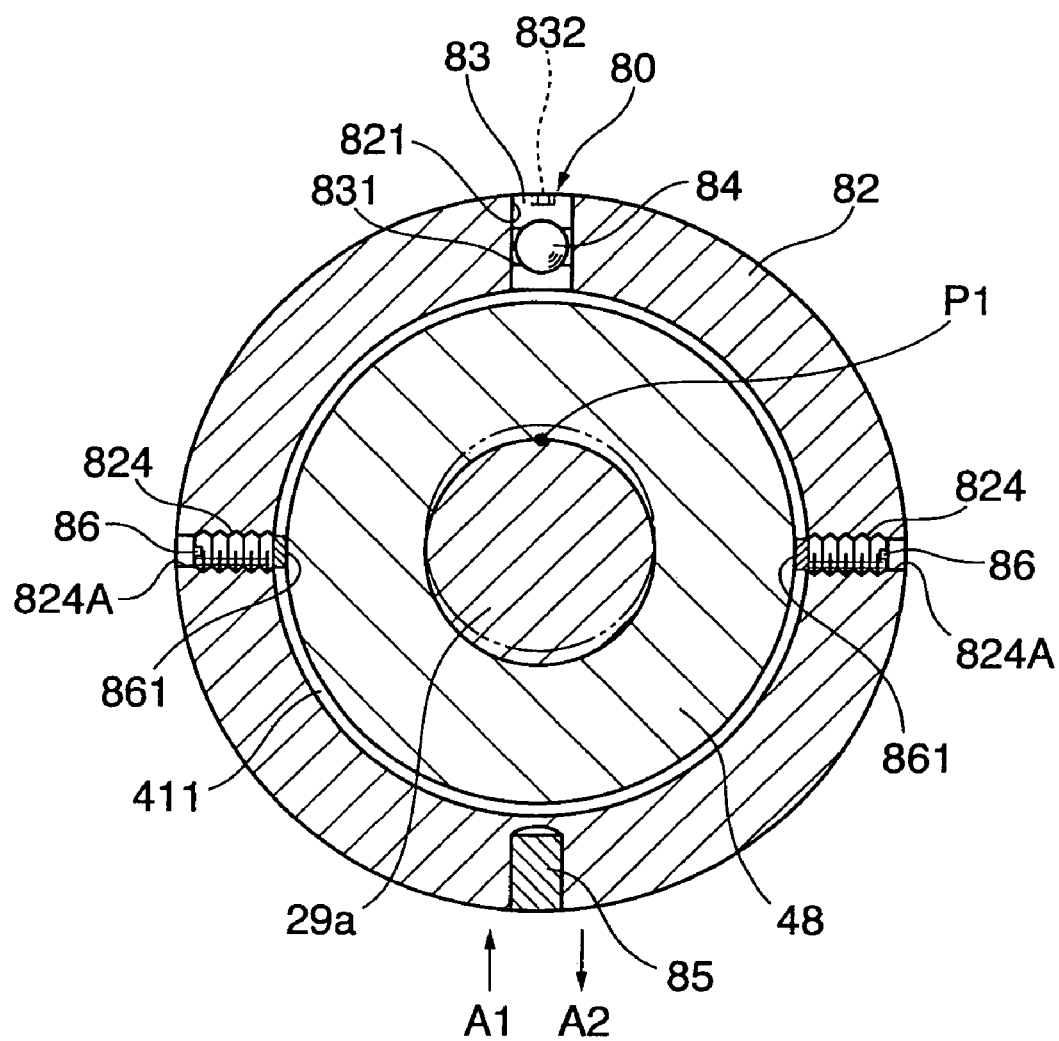
FIG. 9 is an enlarged cross section of the tool holder of the third embodiment, taken along line 9—9 in FIG. 8.
Figure 10A:
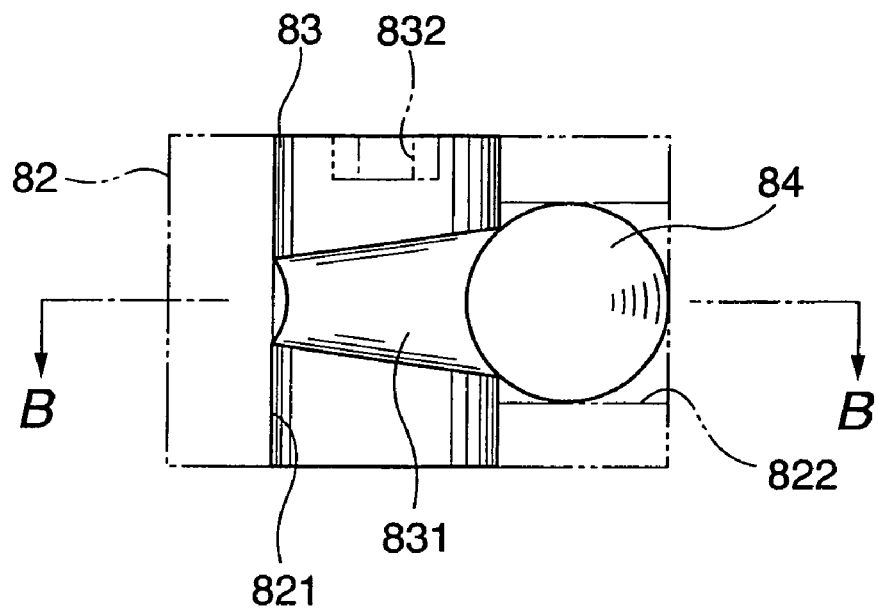
FIG. 10A is an enlarged view of a cam and a steel ball for run-out correction, which are used in the tip run-out correcting mechanism of the third embodiment.
Figure 10B:
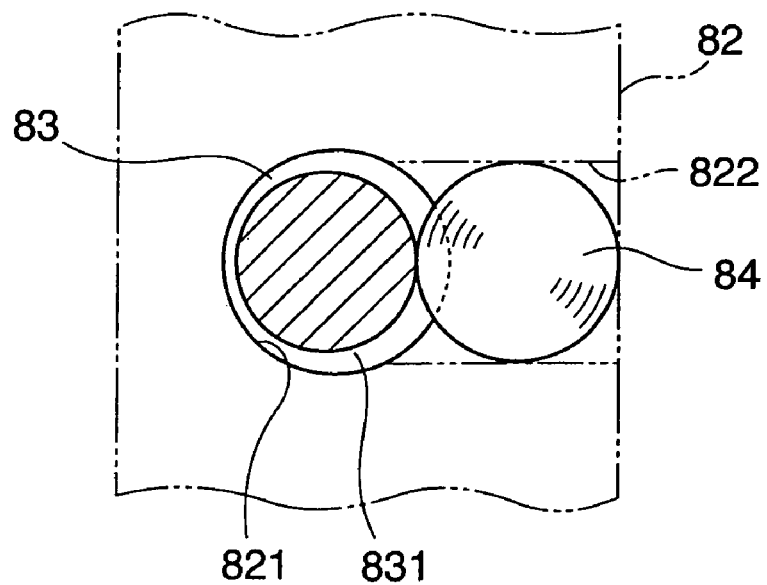
FIG. 10B is an enlarged cross section taken along line 10B—10B in FIG. 10A.

FIG. 8 is a longitudinal cross section of a tool holder equipped with a tip run-out correcting mechanism according to the third embodiment of the present invention; FIG. 9 is an enlarged cross section of the tool holder of the third embodiment, taken along line 9—9 in FIG. 8; FIG. 10A is an enlarged view of a cam and a steel ball for run-out correction, which are used in the tip run-out correcting mechanism of the third embodiment; and FIG. 10B is an enlarged cross section taken along line 10B—10B in FIG. 10A.

In FIGS. 8 and 9, structural elements identical with those shown in FIGS. 3 and 4 are denoted by the same reference numerals, and their repeated descriptions are omitted. Portions different from those of in FIGS. 3 and 4 will mainly be described.

The tool holder shown in FIGS. 8 and 9 differs from the tool holder shown in FIGS. 3 and 4 in that the tool holder shown in FIGS. 8 and 9 has a different tip run-out correction mechanism 80 for correcting tip run-out of the cutting tool 29. The tip run-out correction mechanism 80 includes an annular stepped portion 81, a ring member 82, an operation member 83, and a steel ball 84.

The annular stepped portion 81 is formed on the outer circumference of the cylindrical support portion 48 to be located at an end of the support portion 48, which end faces a rear end face 38a of the clamp sleeve 38, in such a manner that the stepped portion 81 is coaxial with the support portion 48, and has a diameter smaller than that of the rear end face 38a of the clamp sleeve 38.

The ring member 82 is fitted onto the outer circumference of the annular stepped portion 81 to be rotatable in the circumferential direction. The ring member 82 has a thickness corresponding to the difference between the outer diameter of the flange portion 33 and that of the annular stepped portion 81, and a rectangular cross section. As shown in FIGS. 8 and 9, a cylindrical receiving hole 821 and a guide hole 822 communicating with the receiving hole 821 are formed in the ring member 82. The receiving hole 821 radially extends through the ring member 82. The guide hole 822 extends from the receiving hole 821, through the ring member 82, toward the rear end face 38a of the clamp sleeve 38 along a direction parallel to the center axis of the flange portion 33. The operation member 83 is fitted into the receiving hole 821 to be rotatable about a radial direction of the ring member 82. The steel ball 84 is movably fitted into the guide hole 822.

As shown in FIGS. 8, 10A and 10B, the operation member 83 has a cylindrical columnar shape having a diameter corresponding to that of the receiving hole 821. An arcuate cam groove 831 is formed over the entire circumference of the operation member 83 in such a manner that the cam groove 831 is eccentric with respect to the axis of the operation member 83. The steel ball 84 engages the cam groove 831. The cam grove 831 has an arcuate bottom surface having a radius of curvature corresponding to the diameter of the steel ball 84. A tool engagement hole 832 is formed in an end surface of the operation member 83, which end surface is exposed at the outer circumference of the ring member 82.

As shown in FIG. 9, a balance member 85 is embedded in the ring member 82 at a position diametrically opposite the operation member 83 in order to prevent unbalanced rotation of the ring member 82, which would otherwise result from provision of the operation member 83.

Further, as shown in FIG. 9, a plurality of lock screws 86 are provided in the ring member 82 in order to fix the ring member 82 to the stepped portion 81 at a desired circumferential position or angular position. The lock screws 86 radially extend through the ring member 82 and are in screw engagement therewith. Further, an annular groove 411 is formed on the outer circumferential surface of the annular stepped portion 81, and the tip ends of the lock screws 86 enter and come into engagement with the groove 411.

Further, a thread ridge 824A of each female thread hole 824 for receiving the lock screw 86 is crushed in an area adjacent to the outer circumference of the ring member 82, in order to prevent the lock screws 86 from coming off the female thread hole 824 of the ring member 82. Reference numeral 861 denotes an elastic member formed of rubber which is disposed between the tip of each of the lock screws 86 and the cylindrical support portion 48. Notably, the lock screws 86 are screwed into the female thread hole 824 from inside the ring member 82.

Next, there will be described operation of correcting tip run-out of the cutting tool 29 held by the tool holder 30 by use of the tip run-out correction mechanism 80 having the above-described configuration.

First, an operator inserts a shank portion 29a of the cutting tool 29 into the chuck sleeve 34; and subsequently, the operator reduces the chuck sleeve 34 in diameter by use of the clamp sleeve 38 to thereby chuck the shank portion 29a of the cutting tool 29. Next, the operator attaches the tool holder 30, which carries the cutting tool 29, to a main spindle of an unillustrated machine tool. Subsequently, as shown in FIG. 8, the operator brings a test indicator 28 into contact with a circumferential surface of a tip portion of a cutting portion 29b of the cutting tool 29. The operator measures the difference between the maximum and minimum readings of the test indicator 28 during rotation of the main spindle, as tip run-out of the cutting tool 29. Further, from the measured value, the operator determines an angular position at which the tip run-out of the cutting tool 29 becomes greatest.

Subsequently, after rotation of the main spindle is stopped, the operator corrects the run-out on the basis of the determined angular position. Here, it is assumed that at the angular position P1 shown in FIG. 9, as indicated by an imaginary line, the tip of the cutting portion 29a deviates to the greatest extent in the direction of arrow A1, whereby the tip of the cutting portion 29a is located at a shifted position indicated by an imaginary line in FIG. 8. In this case, the ring member 82 is first rotated to a circumferential position at which the operation member 83 coincides with the angular position P1. Subsequently, the operator locks the ring member 82 to the annular stepped portion 81 by use of the lock screws 86. In this state, the operates engages an unillustrated tool such as a bar spanner with the tool engagement hole 832 of the operation member 83, and rotates the operation member 83. When the operation member 83 is rotated, the ball 84 moves toward the rear end face 38a of the clamp sleeve 38 by an amount corresponding to the amount of rotation of the operation member 83 through the action of the cam groove 831 of the operation member 83, and then strongly pushes the rear end face 38a. As a result, the chuck sleeve 34 is elastically deformed, in a radial direction indicated by arrow A2 in FIG. 8, about the base end portion 341 of the chuck sleeve 34, which is continuous with the cylindrical support portion 48 and serves as a bending point. Specifically, while viewing the test indicator 28, the operator rotates the operation member 83 in order to correct the position of the tip of the cutting tool 29 in such a manner that the tip of the cutting tool 29, which was located at a deviated position indicated by the imaginary line in FIG. 8, moves to a position indicated by a solid line. In this manner, the tip run-out d (μm) of the cutting tool 29 can be reduced to zero.

In the above-described third embodiment, the base end portion 341 of the chuck sleeve 34, which is continuous with the cylindrical support portion 48, is elastically deformed in a radial direction in order to reduce the tip run-out of the cutting tool 29 to zero, through an operation of rotating the operation member 83 provided in the ring member 82, which is fitted onto the cylindrical support portion 48 of the holder body 31, to thereby adjust the pressing force which the steel ball 84 applies to the rear end face 38a of the clamp sleeve 38. Therefore, the tip run-out of the cutting tool 29 can be corrected with small force, and high run-out accuracy can be maintained stably. In addition, the tip run-out correction mechanism can be easily applied to tool holders for cutting tools of large diameter.

Next, a modification of the tip run-out correction mechanism 80 will be described with reference to FIG. 11.

Figure 11:
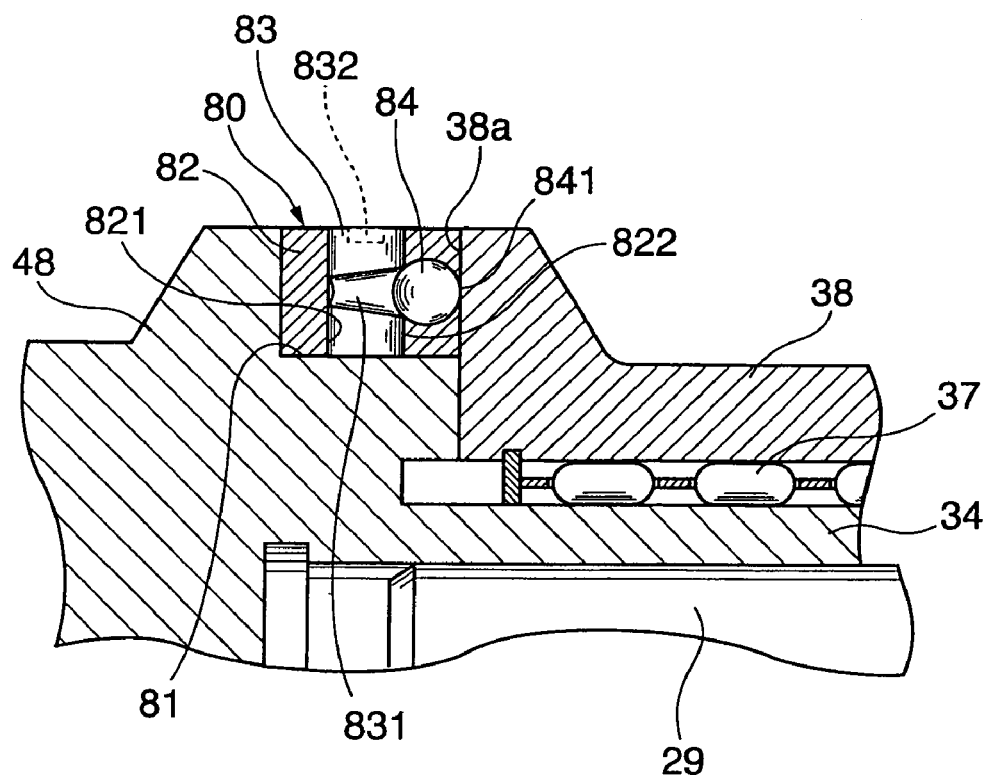
FIGS. 11 to 15 are enlarged cross sections of portions of tool holders each showing a modification of the tip run-out correcting mechanism of the present invention.

FIG. 11 is an enlarged cross section of a portion of the tip run-out correcting mechanism according to the present modification. In the tip run-out correction mechanism 80 shown in FIG. 11, the steel ball 84 is partially cut in order to form a flat press surface 841, which is brought into contact with the rear end face 38a of the clamp sleeve 38. This configuration reduces the surface pressure produced between the steel ball 84 and the rear end face 38a of the clamp sleeve 38, and mitigates damage to their contact surfaces.

Next, a modification in which the tip run-out correction mechanism 80 of FIG. 8 is applied to the tool holder 60 of FIG. 6 will be described with reference to FIG. 12, which is an enlarged cross section of a portion of the tip run-out correcting mechanism according to the present modification.

Figure 12:
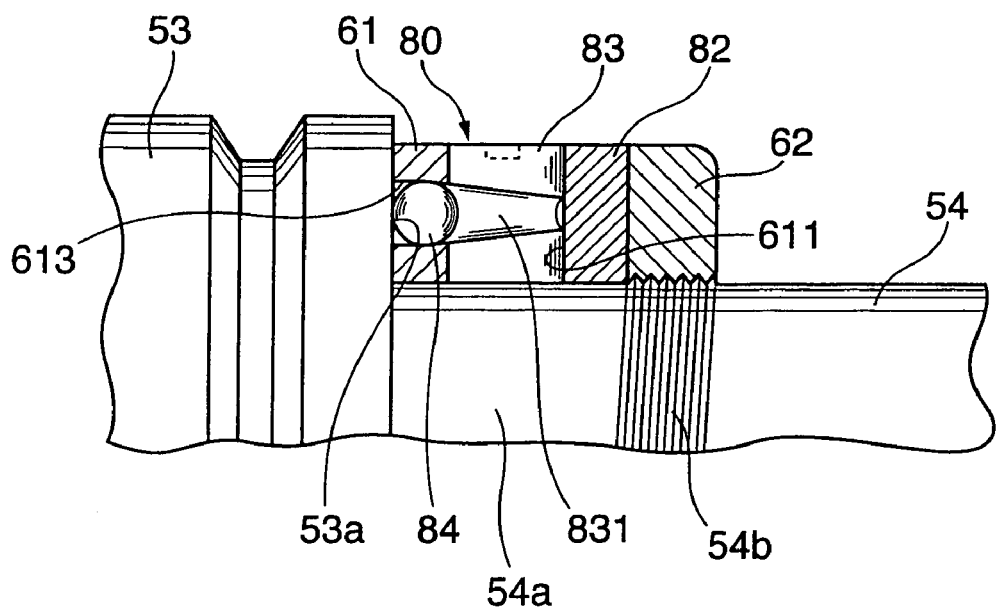

In the modification shown in FIG. 12, the operation member 83 of the tip run-out correction mechanism 80 is fitted into the cam receiving hole 611 of the ring member 61; a guide hole 613 extending from the cam receiving hole 611 to the end face 53a of the flange portion 53 is formed along a direction parallel to the center axis of the arbor 54; and the steel ball 84 is movably fitted into the guide hole 613.

In the tip run-out correction mechanism 80 modified in the above-described manner, as in the case of the tip run-out correction mechanism shown in FIG. 6, an operator can correct tip run-out of a cutting tool through an operation of adjusting the press force that the steel ball 84 applies to the back end face 38a of the clamp sleeve 38, by means of rotating the operation member 83.

The tool holder according to the modified embodiment shown in FIG. 12, which uses a steel ball instead of a pin, provides the same action and effects as those attained in the case of the tool holder shown in FIG. 6.

Notably, in the modification shown in FIG. 12, a portion of the steel ball 84 to come into pressure-contact with the end face 53a of the flange portion 53 may be cut to provide a flat press surface as in the case shown in FIG. 11.

Next, a modification of the tip run-out correction mechanism applied to a tool holder having a structure shown in FIG. 3 will be described with reference to FIG. 13, which is an enlarged cross section of a portion of the tip run-out correcting mechanism according to the present modification.

Figure 13:
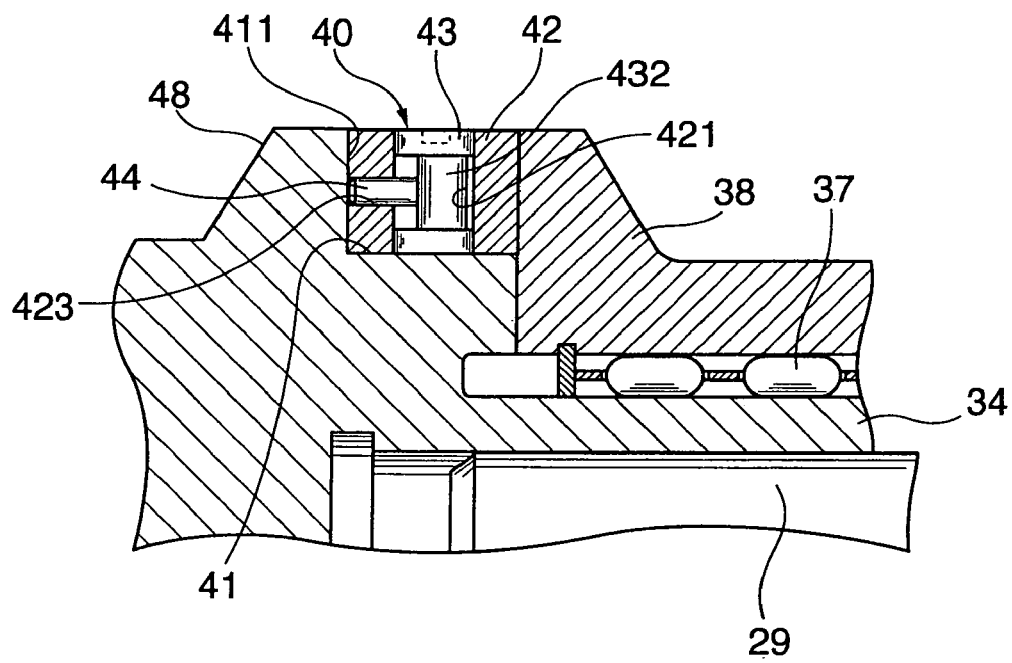

As in the case shown in FIG. 3, in the tip run-out correction mechanism 40 shown in FIG. 13, the eccentric cam 43 is rotatably fitted into the cam receiving hole 421 of the ring member 42. Further, a pin hole 423 extending from the cam receiving hole 421 to the end face 411 of the annular stepped portion 41 is formed along a direction parallel to the center axis of the flange portion 33; and the pin 44 is movably fitted into the pin hole 423.

In the tip run-out correction mechanism 40 modified in the above-described manner, as in the case of the tip run-out correction mechanism shown in FIG. 3, an operator can correct tip run-out of a cutting tool through an operation of adjusting the press force that the pin 44 applies to the end face 411 of the annular stepped portion 41, by means of rotating the eccentric cam 43.

Next, a modification of the tip run-out correction mechanism applied to a tool holder having a structure shown in FIG. 8 will be described with reference to FIG. 14, which is an enlarged cross section of a portion of the tip run-out correcting mechanism according to the present modification.

Figure 14:
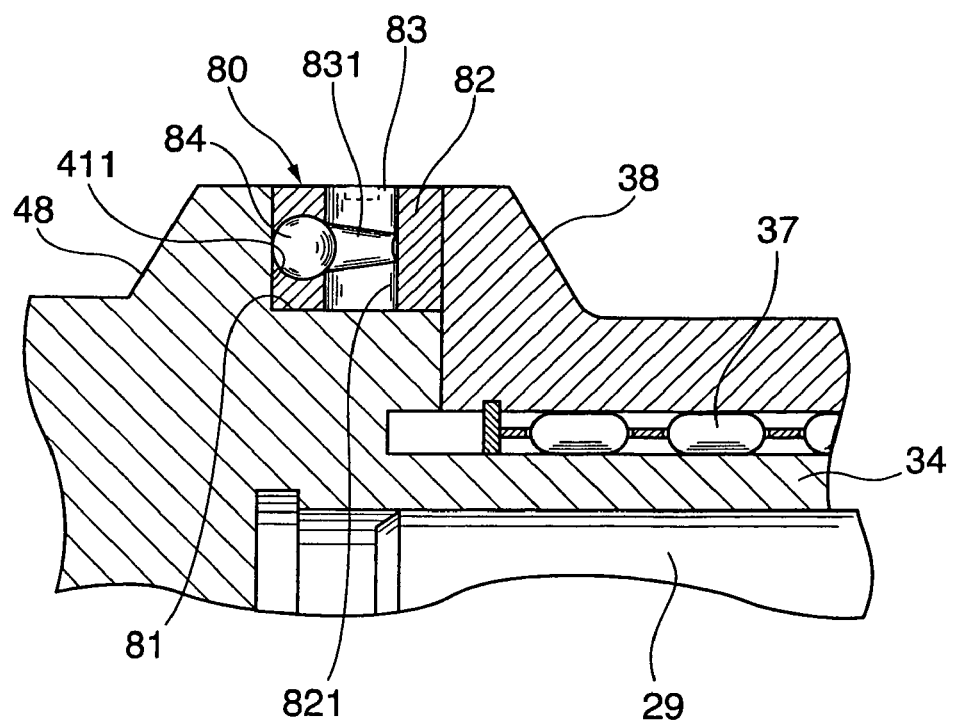

In the modification shown in FIG. 14, as in the case shown in FIG. 8, the operation member 83 of the tip run-out correction mechanism 80 is fitted into the receiving hole 821 of the ring member 82; a guide hole 822 extending from the receiving hole 821 to the end face 411 of the annular stepped portion 81 is formed along a direction parallel to the center axis of the support portion 48; and the steel ball 84 is movably fitted into the guide hole 822.

In the tip run-out correction mechanism 80 modified in the above-described manner, as in the case of the tip run-out correction mechanism shown in FIG. 8, an operator can correct tip run-out of a cutting tool through an operation of adjusting the press force that the steel ball 84 applies to the end face 411 of the annular stepped portion 81, by means of rotating the operation member 83.

Next, a modification of the tip run-out correction mechanism applied to a tool holder having a structure shown in FIG. 6 will be described with reference to FIG. 15, which is an enlarged cross section of a portion of the tip run-out correcting mechanism according to the present modification.

Figure 15:
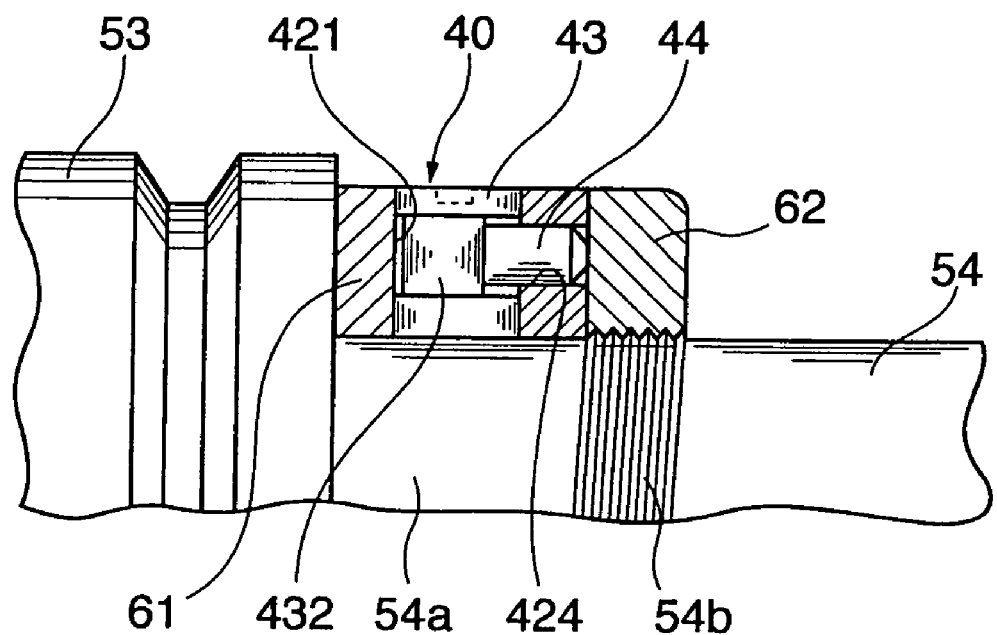

As in the case shown in FIG. 6, in the tip run-out correction mechanism 40 shown in FIG. 15, the eccentric cam 43 is rotatably fitted into the cam receiving hole 421 of the ring member 42. Further, a pin hole 424 extending from the cam receiving hole 421 to the stopper member 62 is formed along a direction parallel to the center axis of the arbor 54; the pin 44 is movably fitted into the pin hole 424.

In the tip run-out correction mechanism 40 modified in the above-described manner, as in the case of the tip run-out correction mechanism shown in FIG. 8, an operator can correct tip run-out of a cutting tool through an operation of adjusting the press force that the pin 44 applies to the stopper member 62, by means of rotating the eccentric cam 43.

Notably, in the second embodiment, the stopper member 62 is fixed to the arbor 54 by means of screw engagement. However, the present invention is not limited thereto, and the stopper member 62 may be fixed to the arbor 54 by use of a lock screw which radially penetrates the ring member 61 and is in screw-engagement with the ring member 61.

In the first embodiment, the shank portion 29a of the cutting tool 29 is inserted directly into the chuck sleeve 34 and is then chucked. However, the present invention is not limited thereto, and the shank portion 29a of the cutting tool 29 may be held via a collet.

Although the first embodiment uses a roller-lock type chuck configured in such a manner that the clamp sleeve 38 is fitted onto the chuck sleeve 34 via the needle rollers 37, the present invention is not limited thereto; the present invention can be applied to tool holders which employ other types of chucks, such as a ball-screw-type chuck configured in such a manner that a groove having a semicircular cross section is spirally formed on each of the outer circumferential surface of the chuck sleeve 34 and the inner circumferential surface of the clamp sleeve 38, and a large number of steel balls are disposed in the spiral grooves.

Obviously, numerous modifications and variations of the present invention are possible in light of the above teachings. It is therefore to be understood that within the scope of the appended claims, the present invention may be practiced otherwise than as specifically described herein.

What is claimed is:

1. A tool holder comprising:
   a holder body having an elastically deformable tool attaching portion adapted to receive a tool;
   a ring member rotatable about a center axis of the holder body but not movable along the center axis;
   a cylindrical member adapted to be located adjacent to the ring member; and
   a force generation mechanism provided in the ring member and adapted to generate a force in a direction substantially parallel to the center axis to actuate the cylindrical member so that the tool attachment portion is elastically deformed in a radial direction perpendicular to the center axis such that tip run-out of the tool approaches zero;
   wherein the force generation mechanism comprises;
      an operation member disposed within the ring member, the operation member radially extending through the ring member and being rotatable about a radially extending axis; and
      a ball element disposed within the ring member and located between the operation member and a the cylindrical member;
      wherein the operation member is rotatable so as to adjust the force that the ball element applies to the cylindrical member to thereby elastically deform a base end portion of the tool attaching portion in such a manner that tip run-out of the tool approaches zero.

2. The tool holder according to claim 1, herein the operation member assumes a cylindrical shape; an arcuate cam groove is formed on an outer circumferential surface of the operation member so as to be eccentric with respect to the axis of the operation member; the ball element is received in the cam groove; and the force that the ball element applies to the cylindrical member is adjusted by means of the cam groove.

3. The tool holder according to claim 1, wherein the ring member includes a balance member for preventing unbalanced rotation of the ring member, which would otherwise result from provision of the ball element.

4. The tool holder according to claim 1, wherein the ball element has a flat press surface.

5. The tool holder according to claim 1, wherein the cylindrical member comprises a clamp sleeve to be rotatably fitted onto the tool attaching portion, the clamp sleeve being rotatable relative to the tool attaching portion to reduce a diameter of the tool attaching portion in order to hold a shank portion of the tool inserted into the tool attaching portion.

6. The tool holder according to claim 5, wherein the operation member is rotated so as to adjust the force that the ball element applies to a rear end face of the clamp sleeve or an end face of an annular stepped portion.

7. The tool holder according to claim 1, wherein the ball element comprises a steel ball.

* * * * *